(12) United States Patent
Imazuka

(10) Patent No.: US 6,915,953 B2
(45) Date of Patent: *Jul. 12, 2005

(54) GATE SYSTEM

(75) Inventor: Katsuo Imazuka, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/679,274

(22) Filed: Oct. 7, 2003

(65) Prior Publication Data

US 2004/0060981 A1 Apr. 1, 2004

Related U.S. Application Data

(62) Division of application No. 10/151,983, filed on May 22, 2002, now Pat. No. 6,712,267, which is a division of application No. 09/643,713, filed on Aug. 23, 2000, now Pat. No. 6,450,404.

(30) Foreign Application Priority Data

Aug. 24, 1999 (JP) ............................................. 11-237272

(51) Int. Cl.[7] ................................................ G06K 7/08
(52) U.S. Cl. ...................... 235/449; 235/380; 235/381; 235/493; 705/5; 705/6
(58) Field of Search ................................. 235/449, 382, 235/384, 380, 381, 493, 492; 705/5, 6

(56) References Cited

U.S. PATENT DOCUMENTS

| | | | |
|---|---|---|---|
| 4,868,376 A | 9/1989 | Lessin et al. | 235/492 |
| 4,984,170 A | 1/1991 | Hirahara | 700/400 |
| 5,043,561 A | 8/1991 | Kimata | 235/384 |
| 5,397,883 A | 3/1995 | Miyashita | 235/384 |
| 5,414,249 A | 5/1995 | Matsumoto | 235/384 |
| 5,550,360 A | 8/1996 | Muraoka | 235/384 |
| 5,754,654 A | 5/1998 | Hiroya et al. | 380/24 |
| 6,070,146 A | 5/2000 | Mimata | 705/13 |

FOREIGN PATENT DOCUMENTS

| | | |
|---|---|---|
| EP | 0 596 579 A1 | 11/1994 |
| EP | 0 789 331 A1 | 8/1997 |
| JP | 409300870 A | 11/1997 |

OTHER PUBLICATIONS

Patent Abstracts of Japan, vol. 1998, No. 02, Jan. 30, 1998 & JP 09 259304 A (Toshiba Corp). Oct. 3, 1997.

Patent Abstracts of Japan, vol. 018, No. 429 (P–1785), Aug. 10, 1994 & JP 06 131523 A (Shinko Electric Co Ltd), May 13, 1994.

Patent Abstracts of Japan, vol. 1996, No. 05, May 31, 1996 & JP 08 016838 A (Toshiba Corp), Jan. 19, 1996.

*Primary Examiner*—Diane I. Lee
*Assistant Examiner*—Seung H Lee
(74) *Attorney, Agent, or Firm*—Pillsbury Winthrop Shaw Pittman LLP

(57) ABSTRACT

The gate system includes a center to perform the ticket reservation control, an automatic gate apparatus that is connected to the center and examines a magnetic recording medium or a wireless card inserted as a ticket, a ticket vending machine to issue a ticket, and an in-compartment ticket issuing terminal carried by a trainman in a train for performing a fare adjustment for a riding past ticket, etc. through the wireless communication.

2 Claims, 7 Drawing Sheets

GATE SYSTEM

CROSS-REFERENCE TO RELATED APPLICATIONS

This is a Divisional of U.S. application Ser. No. 10,151,983, filed May 22, 2002 now U.S. Pat. No. 6,712,267, which is a Divisional of U.S. application No. 09/643,713, filed Aug. 23, 2000 now U.S. Pat. No. 6,450,404, which claims priority from the prior Japanese Patent Application No. 11-237272, filed Aug. 24, 1999, the entire contents all of which are incorporated herein by reference.

BACKGROUND OF THE INVENTION

1. Field of the Invention

The present invention relates to a gate system comprising automatic gate apparatuses that are connected to a central reservation control center installed at stations of transportation facilities such as railways for gate processing of tickets, ticket vending machines, in-compartment supplementary ticket vending terminals carried by trainmen in trains.

2. Description of the Related Art

In recent years, automatic gate apparatuses have been installed at stations of transporting facilities such as railways for automatic gate processing of tickets. These automatic gate apparatuses read data magnetically recorded on tickets that are inserted by users, judge propriety of passage of users and perform such processes as perforating and printing, etc. as necessary. Further, data reading/writing type gate machines utilizing non-contact type cards or wireless devices (hereinafter, referred to as wireless card) through the wireless communication (hereinafter, referred to as wireless automatic gate apparatus) for the magnetic data recording have been proposed. In this wireless automatic gate apparatus, when the passage is judged to be OK, a user is able to pass through the gate and when not OK, the doors of the wireless automatic gate apparatus are closed to protect the passage and a user is informed that he is not allowed to pass the gate by the display panel, voice guidance, etc.

However, in the case of a long-distance ticket for the Shinkansen (the ultra-high speed railway connecting principal cities in Japan), when a ticket is purchased in addition to a ticket, limited express ticket, reserved seat ticket, etc. owned by a user, a ticket recording required data is issued and it was necessary to process plural tickets by an automatic gate apparatus. Further, when a fare is adjusted in a train for the riding past, etc., an in-compartment supplementary ticker is issued additionally and therefore, it was necessitated to collect and process tickets at the manned gate when got off a train. Further, when a large amount ticket such as a long-distance ticket is lost, it was difficult to reissue a ticket to a person who lost the ticket because a person picked up that ticket is able to use it. A system to make all tickets to wireless type is difficult to realize a wireless card medium as requires a higher cost than a magnetic ticket. So, it has been proposed to make SF (Stored Fair) card to a wireless card. However, it was not proposed to make all tickets to wireless cards.

As described above, in the case of long-distance tickets, when purchasing a ticket in addition to such tickets as a ticket, limited express ticket, reserved seat ticket owned by a user, as a ticket recording necessary informing is additionally issued, it is necessary to process plural tickets in an automatic gate apparatus. Therefore, when a fare is adjusted in a train for the riding past, etc., an in-compartment supplementary ticket is issued additionally, it is required to collect and process plural tickets at a manned gate when getting off a train. Accordingly, there was such a problem that when a large amount ticket such as a long-distance ticket is lost, as it is usable by a person who picked it up, it is difficult to reissue the ticket to a person who lost the ticket.

SUMMARY OF THE INVENTION

An object of the present invention is to provide a gate system capable of easily performing the process of long-distance tickets in an automatic gate apparatus, in-compartment fare adjustment process and reissue process.

According to the present invention, a gate system is provided. The gate system comprises a ticket vending machine for issuing a magnetic ticket on which a boarding data is recorded magnetically and a wireless ticket that transmits boarding data through wireless communication; an automatic gate apparatus for examining the ticket according to boarding data of the magnetic ticket or the wireless ticket; and an in-compartment ticket processing terminal carried by a trainman for processing the wireless ticket in a train including a fare adjustment for the riding past through the wireless communication with the wireless ticket.

DETAILED DESCRIPTION OF THE PREFERRED EMBODIMENTS

Figure 1:
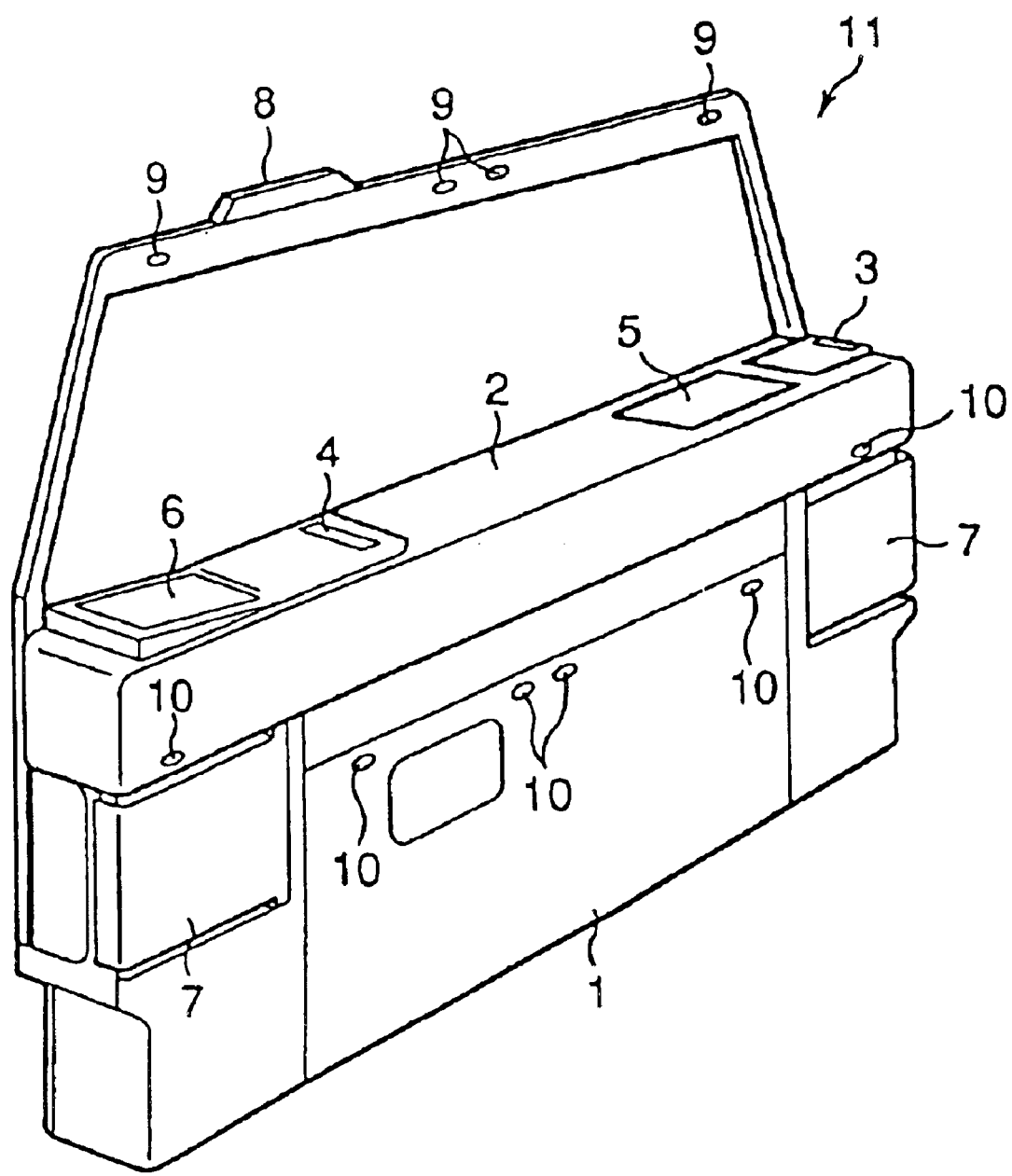
FIG. 1 is a perspective view showing the schematic structure of an automatic gate apparatus of a gate system of the present invention.

A preferred embodiment of the present invention will be described below referring to the drawings.

FIG. 1 shows a schematic structure of an automatic gate apparatus. A top cover 2 is provided on a main body 1 of the ticket gate apparatus, a magnetic ticket insert port 3 is provided at the entrance side of user, into which plural current magnetic tickets (magnetic recording medium) can be inserted, and a magnetic ticket take-out port 4 is provided at the exit side of user. Further, on the top cover 2, there are provided with a wireless antenna 5 for wireless communication with a wireless card (wireless equipment) that is carried by user. Further, there are provided with a guidance display 6 to provide guidance for passage and no-passage, and gates 7 to prevent users to pass at the time of no-passage. Further, the main body 1 is provided with an abnormal/children indicator 8, human sensors 9 and 10.

Figure 2:
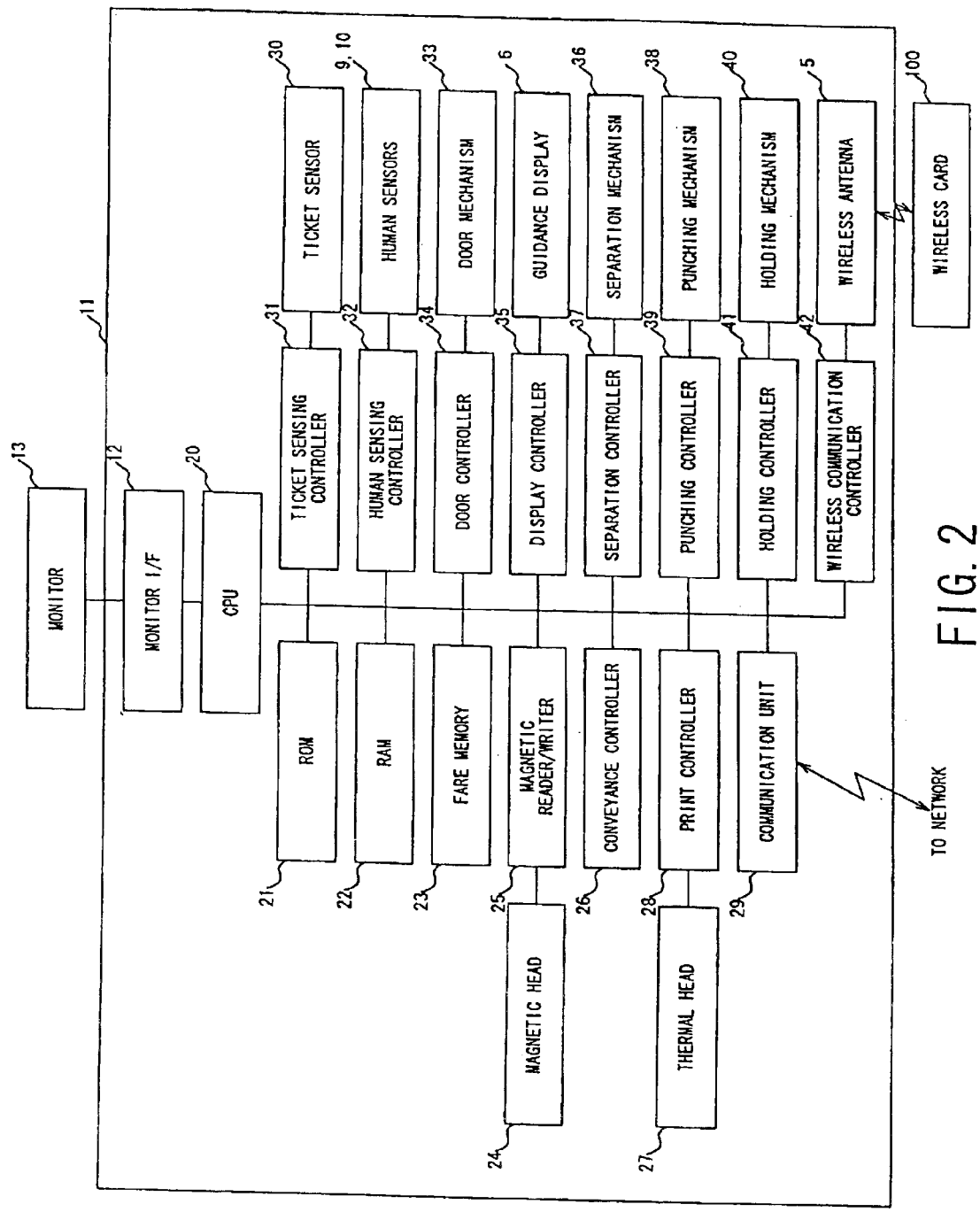
FIG. 2 is a block diagram showing a structure of a control system of the automatic gate apparatus.

FIG. 2 shows a control system of the automatic gate apparatus 11. The automatic gate apparatus 11 is connected to a monitor 13 via a monitor interface 12. The monitor interface 12 is connected with a CPU 20 that controls the entirety of the automatic gate apparatus (a detecting means) 11. The CPU 20 is connected with a ROM 21, a RAM 22, a fare memory 23, a magnetic reader/writer 25 for executing the reading/writing from/to magnetic tickets by a magnetic head 24, a conveyance controller 26, a print controller 28 for controlling the print by a thermal head 27 and a communication unit 29 that is connected to a network. Further, the CPU 20 is connected with a ticket sensing controller 31 to control a ticket sensor 30, a human sensing controller 32 to control the human sensors 9 and 10, a door controller 34 to control a door mechanism 33, a display controller 35 to control the display of the guidance display 6, a separation controller 37 to control a separation mechanism 36, a punching controller 39 to control a punching mechanism 38, a holding controller 41 to control a holding mechanism, and wireless communication controller 42 that is connected to the wireless antenna 5 through which the wireless communication is made with a wireless card 100.

Figure 3:
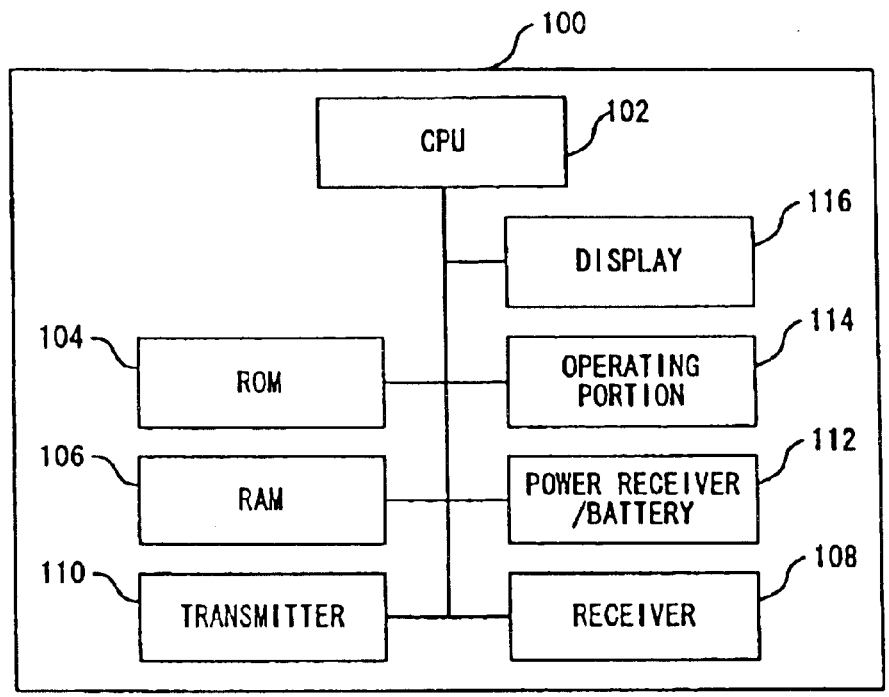
FIG. 3 is a block diagram showing a schematic structure of a wireless card.

FIG. 3 shows a schematic structure of a wireless card. The wireless card 100 is equipped with a CPU 102, a ROM 104, a RAM 106, a receiver 108, a transmitter 110, a power receiver/battery 112, an operating portion 114 and a display unit 116 that serves as a display means.

The CPU (a changing means) 102 controls the operations of all devices of the wireless card 100 and its control program, an ID code, etc. of the wireless card are stored in the ROM 104 and communication data exchanged with the automatic gate apparatus 11 and usage history data, etc. are stored in the RAM 106.

Further, in either the ROM 104 or RAM 106 serving as a storage means, a commutation ticket using data (purchasing data including using section, using period, date of purchase, etc.), SF card using data (purchasing/using data including amount at the time of purchase, using section, expiration date data, remaining amount data, etc.) and long-distance ticket using data (section, date, classification of limited express, etc., designation data, round trip, planning ticket data, etc.) are stored. The planning ticket is, for instance, such a ticket that is usable unlimitedly in a whole day at a predetermined fare irrespective of a boarding distance.

The wireless card 100 receives wireless data transmitted from the automatic gate apparatus 11 by the receiver 108 and transmits the received data to the CPU 102, RAM 106, etc. Further, the data processed in the CPU 102, etc. is returned to the automatic gate apparatus 11 via the transmitter 110.

The present invention uses the wireless card 100 for large amount tickets such as long-distance tickets, planning tickets, etc. in addition to commutation tickets and SF cards. The long distance ticket referred to here as an example is a ticket of using distance longer than about 100 km. Further, short-distance tickets for ordinary lines are used many users and amounts are also low and unit price of card itself has less merit to use large amount wireless card and the same magnetized tickets as current state are used.

As described above, when a long-distance ticket is used, it is issued as a wireless card 100 and therefore, the entrance/exit can be processed by an automatic gate apparatus that is capable of processing wireless cards shown in FIG. 1. Further, when it is needed to change contents of purchased tickets, it can be processed by re-writing data written into a wireless card 100.

Further, recovered wireless cards 100 can be reused by initializing wireless data and various displays. When a print type is used for the display unit, the thermal sensitive layer may be renewed.

In the structure as described above, how to process the changing sections, calendar, etc. on a wireless card that is used as a long-distance ticket and in-compartment fare adjustment for destination change, etc. will be explained below.

First, for additional purchasing of tickets, there is a method to collect a fare by rewriting data by a ticket processing terminal at a long-distance ticket vending window of a station or a method to have user to insert a ticket into a ticket vending machine that has an additional purchasing function and input required additional contents, and after confirming the receipt of fare, rewrite data and return the ticket to the user.

Figure 4:
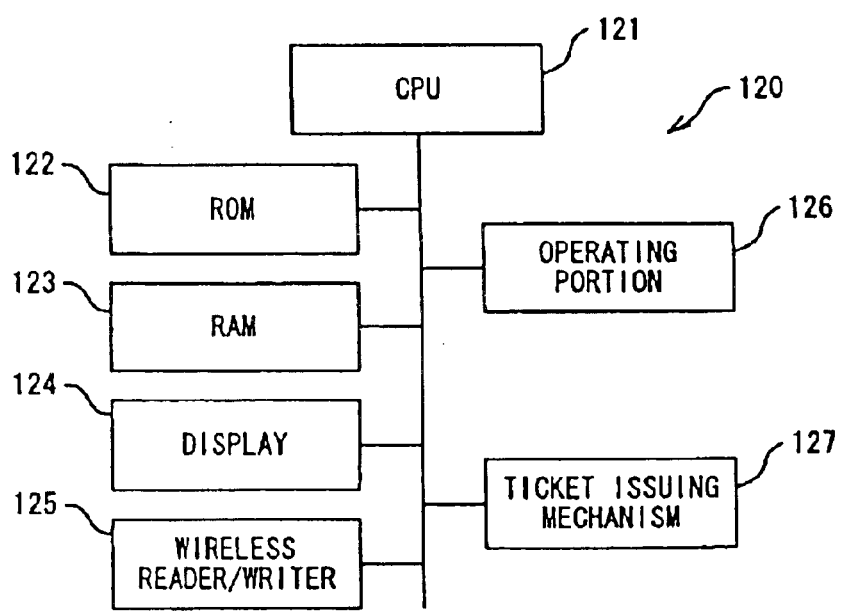
FIG. 4 is a block diagram showing a schematic structure of a ticket vending machine equipped with a wireless card additional purchasing function.

FIG. 4 shows a schematic structure of a ticket vending machine 120 that is capable of issuing a wireless card 100 and a magnetic ticket and has a wireless card 100 additional purchasing function. The ticket vending machine 120 comprises a CPU (an updating means) 121 to control the entire machine, a ROM 122, a RAM 123, a display unit 124 to display various data as a display means, a wireless reader/writer 125 to communicate with a wireless card 100 as a reading means, an operation panel 126 as an directing means, and a ticket issuing mechanism 127.

The ticket vending machine 120 will be described below based on a case where it is installed in the station yard. The ticket vending machine 120 is also possible to install at a train platform and in a train (in this case, the transmission/receiving with a central reservation control center becomes the wireless communication) in addition to the station yard.

Figure 5:
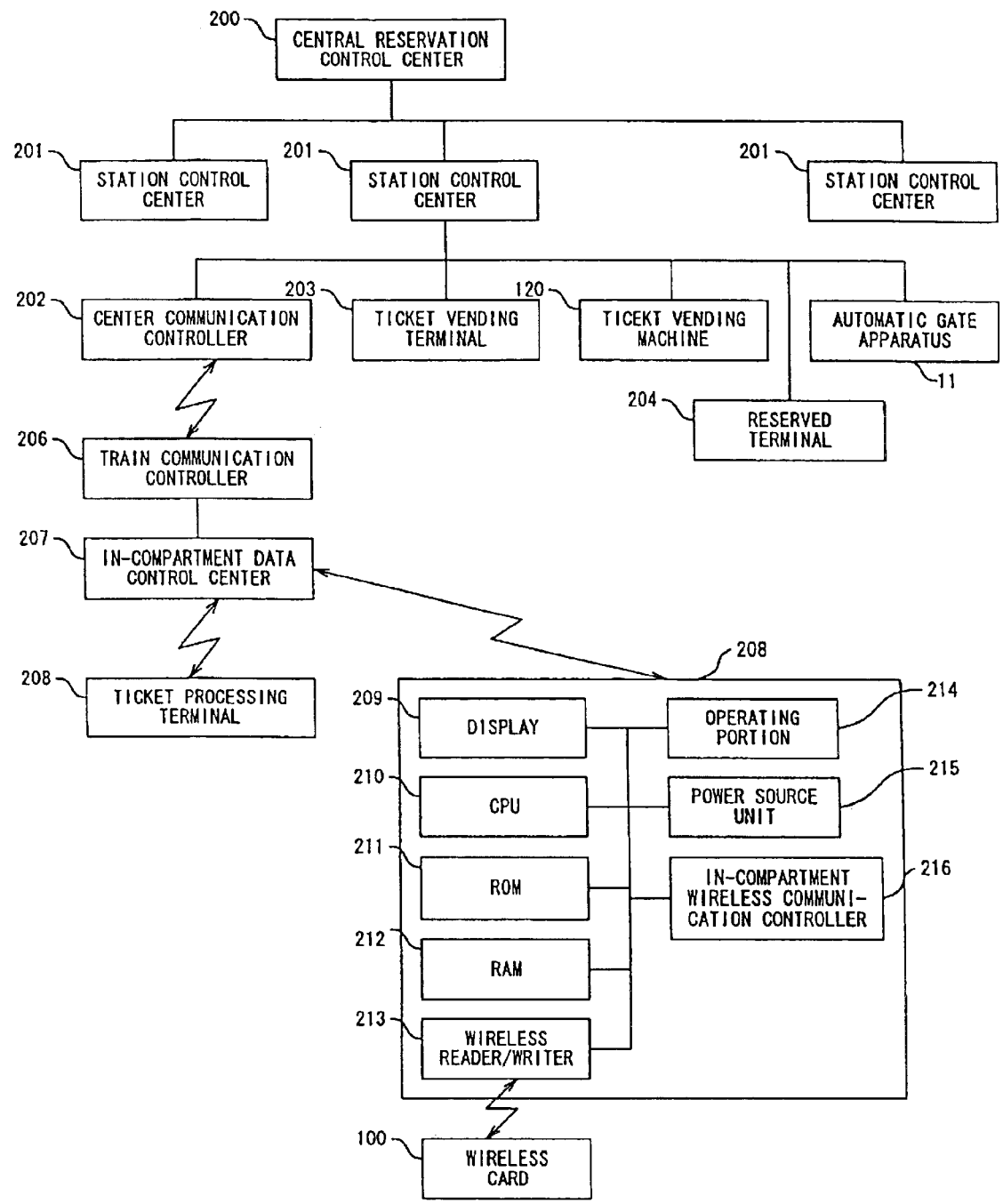
FIG. 5 is a block diagram showing a schematic structure of a gate system of the present invention.

FIG. 5 shows the schematic structure of the gate system of the present invention. The central reservation control center has station control centers 201, 202 and so on at stations.

The station control center 201 of each station is connected with a center communication controller 202 that controls the wireless communication with a train from the station control center 201, a ticket vending terminal 203 for updating data of a wireless card 100 at a long-distance ticket vending window of a station in the case of additional purchase of a wireless card 100 that is used as a long-distance ticket, a ticket vending machine 120, an automatic gate apparatus 11 and a reserved terminal 204 for providing various data that will be described later.

In a train, a train communication controller 206 and an in-compartment data control center 207 are provided. The in-compartment data control center 207 makes the wireless communication with a ticket processing terminal that is carried by a trainman.

The ticket processing terminal 208 comprises a display 209, a CPU 210, a ROM 211, a RAM 212, a wireless reader/writer 213 to read and write data through the wireless communication with a wireless card 100, an operation unit 214, a power source unit 215 and an in-compartment wireless communication controller that controls the wireless communication with the in-compartment data control center 207.

Designated data is referred to the central reservation control center 200 from the station control center 201 by communicating data with the center communication controller 202 of a neighboring station via the in-compartment data control center 207 in a train from the ticket processing terminal 208.

Figure 6:
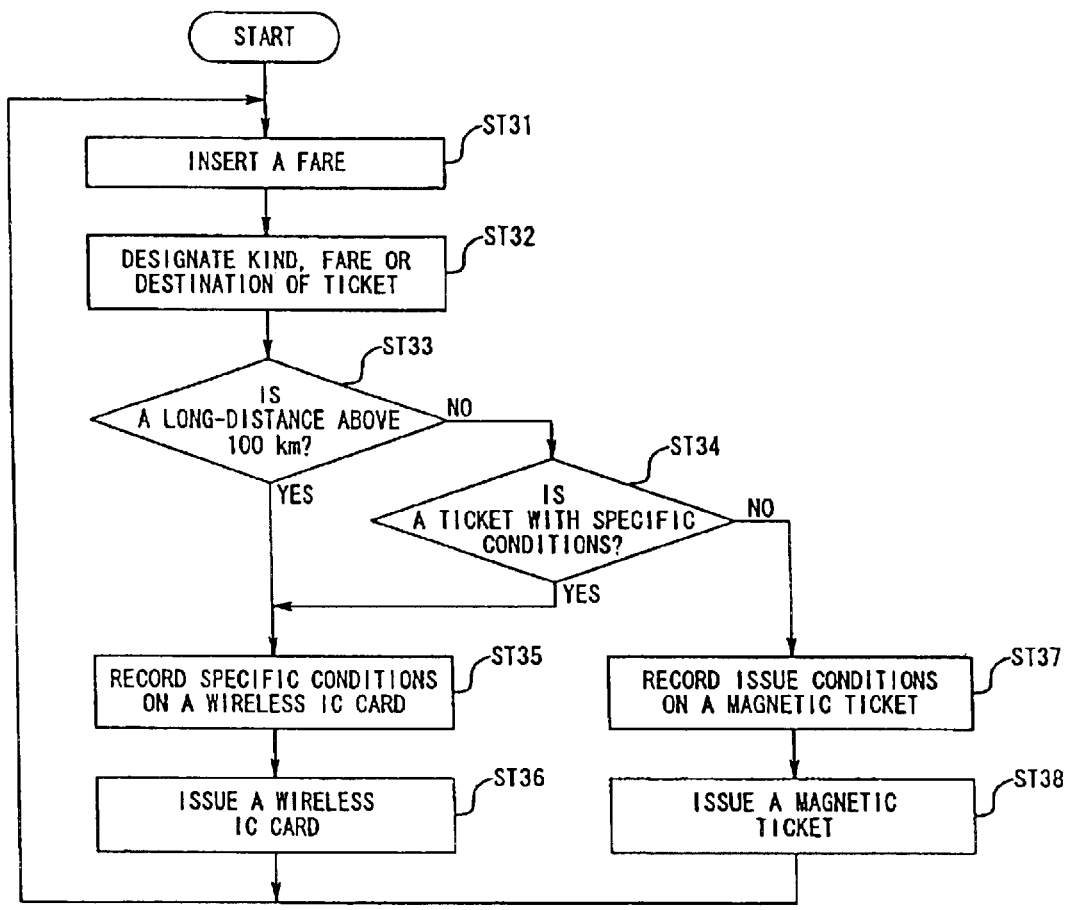
FIG. 6 is a flowchart for explaining operations when purchasing a short-distance ticket and a long-distance ticket from a ticket vending machine.

The operation of the ticket vending machine 120 when a user purchases a short-distance ticket or a long-distance ticket from the ticket vending machine 120 will be explained referring to a flowchart shown in FIG. 6.

User inserts a train fare into the fare insert port of the ticket vending machine 120 (ST31) and designate a kind of a ticket desired to purchase, for instance, a railway ticket, a limited express ticket, a reserved seat ticket, a train fare, destination and the like on the operation panel 126 while looking at the indication on the display unit 124 (ST32).

The CPU 121 of the ticket vending machine 120 judges whether the covering distance of a train taken by a user out of the contents designated on the operation panel 126 is a long-distance more than 100 km or a short-distance below 100 km (ST33).

When the covering distance of a train was judged to be below 100 km in Step ST33, a ticket is judged whether it is a ticket of specific condition (ST34). The specific condition referred to here is whether a ticket is a limited express ticket or a reserved seat ticket.

When the covering distance of a train was judged to be above 100 km in Step ST33 or when a ticket is a ticket of specific condition, for instance, a limited express ticket or a reserved seat ticket even if the covering distance is below 100 mm, the step proceeds to Step ST35.

In Step ST35, the issue conditions designated by user are recorded on a wireless IC card by the ticket issuing mechanism 127. When the wireless IC card is prepared, a wireless IC card 100 shown in FIG. 3 is issued to a user from the exit port of the ticket vending machine 120 (ST36).

When a ticket is not a ticket of specific conditions, for instance, a limited express ticket or a reserved seat ticket in ST ST34, the step proceeds to Step ST37.

In Step ST37, the ticket issuing conditions designated by user is recorded on a magnetic ticket by the ticket issuing mechanism 127. When a magnetic ticket is prepared, it is issued to a user from the exit port of the ticket vending machine 120 (ST38).

The ticket issuing conditions to be recorded in Step 35 are a boarding section, date, an issuing company name, when a kind of ticket is, for instance, a limited express ticket, its boarding section or a reserved seat number if a reserved seat ticket.

The issuing conditions that are recorded in Step ST37 are a boarding section, date, an issuing company name, etc.

That is, a wireless IC card is issued for a large amount or a long-distance ticket, a limited express ticket, a reserved seat ticket and a magnetic ticker is issued for such ordinary tickets as a small amount, a short-distance ticket.

Figure 7:
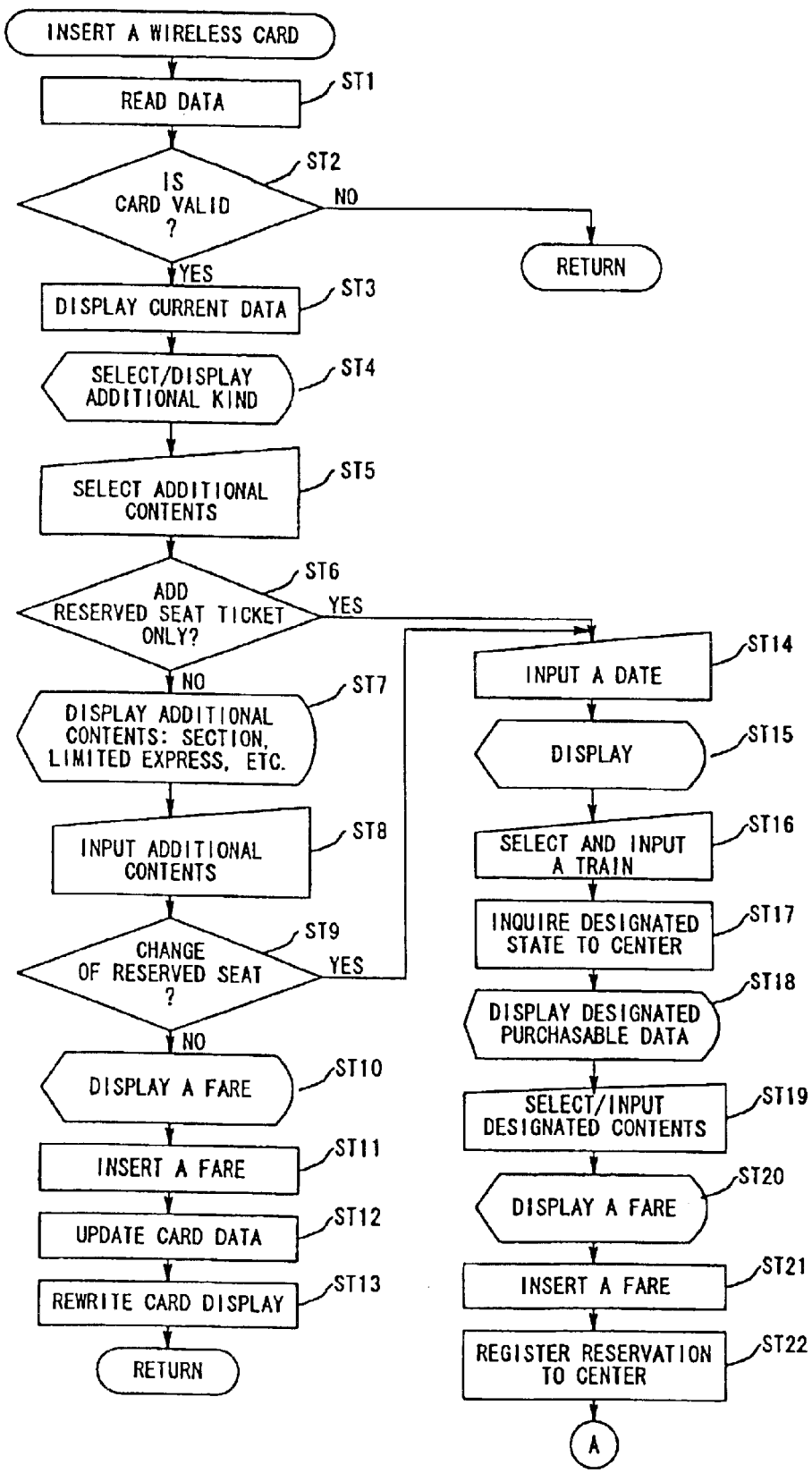
FIG. 7 is a flowchart for explaining operations when additionally purchasing a ticket from a ticket vending machine using a wireless card.
Figure 8:
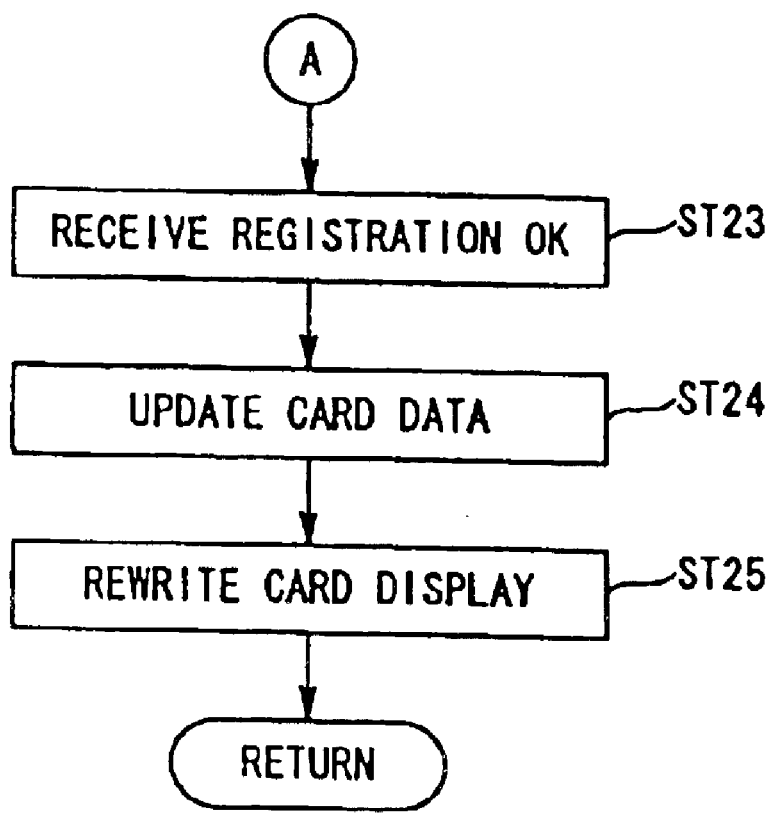
FIG. 8 is a flowchart for explaining operations when additionally purchasing a ticket from a ticket vending machine using a wireless card.

Then, the operations when additionally purchasing a ticket from the ticket vending machine 120 using a wireless card 100 as a long-distance ticket will be explained referring to the flowcharts shown in FIG. 7 and FIG. 8.

First, when reading data of the ROM 104 or the RAM 106 of the wireless card 100 by the wireless reader/writer 125, the CPU 121 of the ticket vending machine 120 checks if this wireless card 100 is valid or not (ST2), and if invalid, this wireless card 100 is returned to a user.

When the wireless card 100 is confirmed to be valid in Step ST2, the CPU 121 displays the read current data on the display unit 124 (ST3), and further displays the selection of additional kinds on the display unit 124 (ST4). The additional kinds displayed here are a section, change of a reserved seat; a kind of a section of limited express ticket, etc.

When additional contents are selected from the operation panel 126 of the ticket vending machine 120 (ST5), if the additional contents are not a reserved seat ticket only (ST6), the CPU 121 displays the additional contents of the section, the limited express, etc. (ST7). Then, when additional contents are input through the operation panel 126 of the ticket vending machine 120 (ST8), the CPU 121 proceeds to Step ST14 if there is the reserved seat change. If there is no reserved seat change (ST9), the CPU 121 displays a fare on the display unit 124 (ST10).

When a fare is inserted by a user (ST11), the CPU 121 updates the data of the wireless card 100 (ST12), rewrites the display on the display 116 of the wireless card 100 (ST13) and returns the wireless card 100 to the user.

When a reserved seat ticket only is added in Step ST6, or a reserved seat is changed in Step ST9 and date is input through the operation panel 126 of the ticket vending machine 120 (ST14), the CPU 121 displays the train data on the display unit 124 (ST15).

When a train is selected from the train data displayed on the display unit 124 through the operation panel 126 (ST16), the CPU 121 inquires this designated state to the central reservation control center 200 via the station control center 201 (ST17) and displays the designated ticket purchasable data on the display unit 124 (ST18).

When the designated contents are selected and input through the operation panel (ST19), the CPU 121 displays a fare (ST20). Then, when a fare is inserted by user (ST21), the CPU 121 registers the reservation on the central reservation control center 200 (ST22). The CPU 121 receives the registration OK from the central reservation control center 200 (ST23), updates the data of the wireless card 100 (ST24), rewrites the display on the display 116 of the wireless card 100 (ST13) and returns the wireless card 100 to a user.

Next, in the case of riding past, an in-compartment supplementary ticket was so far issued in a train. In this invention, this case is processed using a ticket processing terminal that is capable of rewriting wireless data including designated data.

Next, the riding past process will be explained referring to FIG. 5.

When a user carrying a wireless card 100 as a long-distance ticket rides past a destination, a trainman reads the data recorded on the wireless card 100 carried by the user using a ticket processing terminal 208 in a train. When reading the data of the wireless card 100 by a wireless reader/writer 213 of the ticket processing terminal 208, a CPU 210 displays the read data on the display 209. Further, when the riding past data desired by a user is input through an operation unit 214, the CPU 210 communicates with an in-compartment data control center 207 of the train through an in-compartment wireless communication controller 216.

A train communication controller 206 transmits the ride past data received at the in-compartment data control center 207 to a center communication controller 202 of a neighboring station.

Further, the function of the ticket processing terminal 208 explained below is also provided to the ticket vending machine 120 and when the ticket vending machine 120 is installed in a train, the same changing process can be made by the ticket vending machine 120.

The neighboring station control center 201 of the train inquires the data received from the center communication controller 202 to the central reservation control center 200. When the riding past desired by the user from the inquired data is possible, the central reservation control center 200 sends an approval data to the station control center 201.

As a result, the data of the wireless card 100 is updated through the station control center 201, the center communication controller 202, the train communication controller 206 of the train, the in-compartment data control center 207 and the ticket processing terminal 208, and the display on the display 116 of the wireless card 100 is rewritten.

Thus, in this embodiment, a user is able to recognize addition of data by rewriting the display on the display 116 of the wireless card 100 when adding/changing data.

Further, regarding a display, it may be updated so that it can be rewritten in thermal sensitive print, etc. or a writing area is predetermined for each data and a display is added for each additional purchase. Further, the display contents of the display 116 may be changed corresponding to the using state. For instance, in the case of a long-distance round-trip ticket using a wireless card 100, the forward trip data is first displayed and switched to the backward trip display when getting off the train in the forward trip or the data of reimbursement due to delay of a train is changed when processing the getting off a train. If display contents are numerous, the display pictures of the display 116 may be made changeable with switches on a wireless card 100.

Further, when a large amount ticket is made a wireless card, it becomes possible to assign Issue No., ID No., etc. to an issued ticket. Thus, it becomes possible to confirm an illegal use of a lost ticket by a person who picked it up by means of the automatic gate apparatus 11 and to reissue a ticket. As an ID for this confirmation, a using date, a train and a reserved sheet number, etc. may be used.

As a long-distance ticket recovering method using a wireless card 100 of this embodiment, there is a method to perform the invalidation process only of a wireless card 100 through the wireless writing and does not recover the wireless card 100 directly when getting off a train or a method to recover a wireless card 100 using an automatic gate apparatus that is capable of recovering a wireless card 100 when a user got off a train. When the validation process of a wireless card 100 only is performed, for recovering wireless card, a certain amount may be reimbursed to a user when he returns a wireless card 100.

As it is not required to return tickets to a user, it becomes possible to solve such problems that return of a planned ticket to the gate window by a user in the middle of use, inverse use of forward and backward trip tickets, making designated data for the backward trip unclear.

Further, the wireless card 100 may receive electromagnetic wave transmitted from the automatic gate apparatus and supplies the wave by converting into electric power by the power receiver/battery 112, and a battery itself may be built in the power receiver/battery 112.

The wireless card 100 is equipped with the display 116 for displaying the data stored in the ROM 104, the RAM 106 and the operating portion 114 for performing the operations to control the communication with the automatic gate apparatus. The operating portion 114 performs such operations as the power source ON/OFF, setting of propriety of communication, stopping of either functions of the commutation ticket or SF card when a wireless card has both data of these functions (to enable the communication by data of one of them).

Further, as an example to provide data to a user using the wireless card 100, a long-distance traveler is able to check required data utilizing the reserved terminal 204. The reserved terminal 204 having storage, display and communication means provides such data as Train Platform No., time, a reserved seat location, etc. and in addition, the weather forecast for a destination according to the wireless communication with the wireless card 100. Further, it may be allowed to provide PR data when a used wireless card 100 is presented to the reserved terminal 204.

As explained above, according to the embodiment of the present invention, when purchasing a ticket, a limited express train ticket, a reserved seat ticket in addition to a currently owned ticket in the Shinkansen, etc., the additional issue of a medium recording required data becomes unnecessary and it does not require to process plural sheets of tickets in the automatic gate apparatus.

Further, when a fare is adjusted in a train for riding past, etc., the additional issue of an in-compartment supplementary ticket becomes unnecessary and the exit process by the wireless automatic gate apparatus becomes possible when exits from a station.

Further, if long-distance tickets and other large amount tickets are lost, an illegal use of lost tickets can be disclosed by the use of various kinds of ID and it becomes possible to reissue tickets.

As described above in detail, according to the present invention, it is possible to provide a gate system capable of easily performing the processing of long-distance tickets by the automatic gate apparatus, in-compartment fare adjustment and reissue of tickets by an automatic gate apparatus.

What is claimed is:

1. A ticket processing terminal carried by a trainman in a train comprising:

a receiver for receiving boarding data including a boarding section and designated data from a wireless ticket carried by a user in the train on which the boarding data is recorded through wireless communication;

a display for displaying the boarding data received by the receiver;

an operation unit operated by the trainman in the train for directing change of the boarding data displayed on the display and change of the boarding data desired by the user; and a processing unit for changing the boarding data of which change is directed by the operation unit through wireless communication with a control center outside the train and is based on approval from the control center, wherein the ticket processing terminal is constructed and arranged to be located within the train.

2. The ticket processing terminal according to claim 1, further comprising:

a wireless communication controller that transmits the boarding data of which change is indicated by the operation unit to a storage unit storing the boarding data for plural wireless tickets and receives a propriety of change of boarding data transmitted from the storage unit;

wherein the processing unit updates boarding data of the wireless ticket through the wireless communication when it is received that the boarding data can be changed by the wireless communication controller.

* * * * *